United States Patent

[11] 3,597,977

[72] Inventor Stephen J. Zierak
Westwood, Mass.
[21] Appl. No. 859,359
[22] Filed Sept. 19, 1969
[45] Patented Aug. 10, 1971
[73] Assignee Metal Bellows Corporation
Sharon, Mass.

[54] TEMPERATURE SENSOR
10 Claims, 3 Drawing Figs.

[52] U.S. Cl. .................................................. 73/368.7,
73/410, 337/307
[51] Int. Cl. .................................................. G01k 5/42,
H01h 37/36
[50] Field of Search .................................... 73/368.7,
368, 410; 251/17; 137/79, 236; 92/92, 93;
337/306—308; 340/227; 200/83 C

[56] References Cited
UNITED STATES PATENTS
766,820   8/1904   Fulton ......................... 73/368.7 UX 2,316,611   4/1943   Nause ........................... 73/368.7 X
2,507,911   5/1950   Keller ........................... 73/368.7 X
FOREIGN PATENTS
877,367   9/1961   Great Britain ............... 337/307

Primary Examiner—Louis R. Prince
Assistant Examiner—Daniel M. Yasich
Attorney—Cesari and McKenna ABSTRACT: A temperature sensor having fast response employs a fluidtight, thin-walled bellows made of a thermally conductive material. The bellows has a number of relatively wide annular diaphragms so that its surface-to-volume ratio is a maximum and it is held rigid. A fluid passage communicates between the interior of the bellows and the device to be actuated and the bellows and passage are filled with an expansible fluid. When the bellows is subjected to a heated medium, heat is immediately conducted to substantially all of the fluid which expands rapidly through the passage and actuates an associated pressure responsive device.

Patented Aug. 10, 1971

INVENTOR
STEPHEN J. ZIERAK

BY

*Blair Cesari + St. Onge*

ATTORNEYS

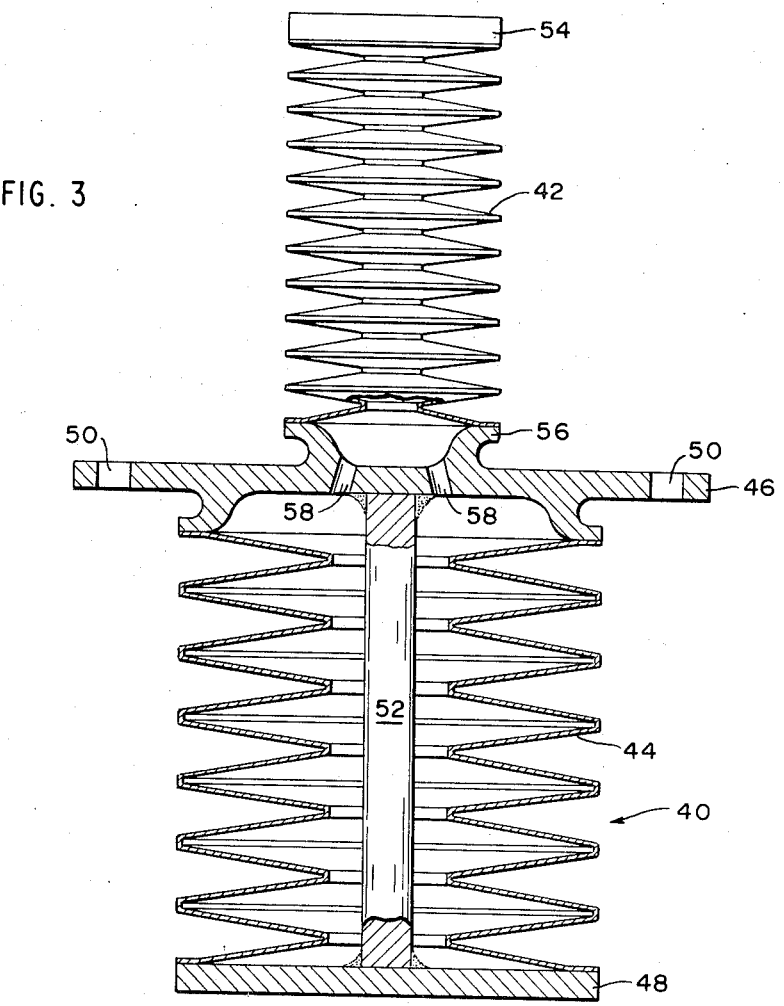

3,597,977

TEMPERATURE SENSOR

BACKGROUND OF THE INVENTION

1. Field of the Invention

This invention relates to a temperature sensor. It relates more particularly to an improved bulb for containing the expansible liquid in a temperature sensor.

Temperature sensors are used in process control systems, heating and cooling systems and other applications where it is necessary for the system to respond quickly to changes in the temperature of a fluid medium, be it gas or liquid. In their operation, these temperature sensors function much like conventional glass bulb thermometers. That is, the usual sensor comprises a tube connecting to a reservoir for fluid which expands upon heating.

Unlike the thermometer, however, the other end of the tube is connected to a fluid pressure responsive device. As the temperature of the fluid increases, the fluid expands and exerts sufficient pressure on the associated device to actuate it. In a typical case, the pressure responsive device may be a bellows or diaphragm switch, valve or the like.

2. Prior Art

Conventional temperature sensors comprise a long thermally conductive tube and a number of thermally conductive fins closely spaced apart along part of the tube. The tube is connected to a pressure responsive device such as a diaphragm switch and the entire system is filled with an expansible fluid. When the fluid is heated, it expands up the tube and actuates the switch. The purpose of the fins is to maximize the heat transfer between the medium whose temperature the sensor is responding to and the fluid inside the sensor so that the system will respond as quickly as possible to changes in the temperature of the medium.

While these prior sensors have worked satisfactorily in many applications, they do not respond quickly enough in other situations which demand unusually fast reaction to changing temperature conditions. For example, in certain beverage process control applications, a few seconds delay in the response of the sensor to a change in the temperature of the beverage can result in a considerable amount of wastage and spoilage because of the very large beverage flow rates involved.

The prior fin tube sensors are also disadvantaged in that they contain no provision for adjusting the volume of the sensor for calibration purposes or to suit different conditions.

SUMMARY OF THE INVENTION

Accordingly, this invention aims to provide an improved temperature sensor which responds very quickly to changes in the temperature of a medium.

Another object of the invention is to provide a temperature sensor having exceptionally good heat transfer characteristics.

Another object is to provide a temperature sensor which is rugged and reliable and has a long, useful life.

A further object of the invention is to provide a temperature sensor whose volume can be adjusted to vary its actuation point.

Still another object of the invention is to provide a temperature sensor having one or more of the above characteristics.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Briefly, my improved temperature sensor comprises a thin-walled bellows made of a highly thermally conductive material. The bellows has a number of relatively wide, annular diaphragms and is constrained from expanding or contracting by rigid means extending between its ends.

A passage communicates between the interior of the bellows and the device to be actuated. For illustrative purposes, we will describe the passage as being connected to a diaphragm switch which controls a beverage blending process so that the temperature of the beverage is kept below a selected critical value. The bellows, the communicating passage and the pressure capsule of the switch are completely filled with an expansible fluid.

The bellows is normally immersed in the medium being controlled, i.e. the beverage mixture. As the temperature of the beverage rises, the fluid expands through the passage. When the temperature reaches a certain point, the expanding bellows actuates the switch. The switch, in turn, controls elements in the blending system to alleviate the overheated condition of the beverage.

The instant sensor has a very fast response time because of its excellent heat transfer characteristics. More particularly, the bellows has very thin, highly thermally conductive walls so that heat from the medium outside the bellows is conducted almost immediately to the fluid inside the bellows. Also, the individual annular diaphragms making up the bellows have a relatively large outer-to-inner diameter ratio which gives the bellows a maximum surface-to-volume ratio. As a result, the total volume of fluid in the system is minimized. Moreover, most of the fluid inside the bellows is contained as thin layers in the relatively short, wide bellows convolutions. Resultantly, most of the fluid is at or very near a wall of the bellows which is directly exposed to the beverage being controlled. Thus, the temperature of the fluid in the sensor follows very closely the temperature of the medium outside the bellows, with the result that the overall system reacts very quickly to changing temperature conditions and there is minimum lag between an excessive temperature condition of the beverage and its correction.

In a preferred embodiment of my sensor, provision is also made for regulating the effective volume of the bellows so that the sensor can be calibrated or set to respond at different temperatures to suit different applications or conditions.

BRIEF DESCRIPTION OF THE DRAWINGS

For a fuller understanding of the nature and objects of the invention, reference should be had to the following detailed description taken in connection with the accompanying drawings, in which:

FIG. 3 is a side elevational view with parts cut away of another sensor embodiment.

DESCRIPTION OF THE PREFERRED EMBODIMENTS

Figure 1:
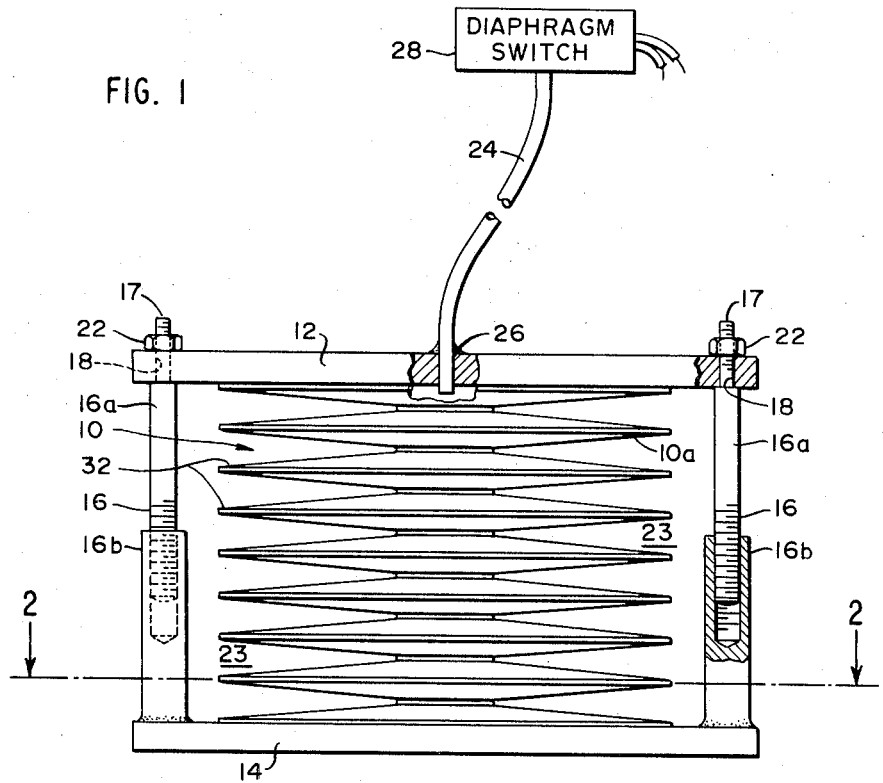
FIG. 1 is a side elevational view with parts cut away of a temperature sensor embodying my invention and connected to control a switch.

Referring first to FIG. 1 of the drawings, the temperature sensor per se comprises a bellows 10 closed off by a pair of end plates 12 and 14 which have a diameter somewhat larger than that of the bellows. Bellows 10 is made of a highly thermally conductive material such as stainless steel and it has relatively thin walls on the order of 10 mils so that it is normally expandable and compressible.

Bellows 10 is, however, constrained against such movement by means of three rigid rods 16 extending between end plates 12 and 14. In the illustrated arrangement, each rod 16 comprises threaded-together sections 16a and 16b. Sections 16b are butt-welded to plate 14 and rod sections 16a have reduced diameter threaded ends 17 which extend through registering passages 18 in plate 12. Threaded nuts 22 turned down on ends 17 prevent relative movement between the two plates.

A tube 24 has one end extending through an axial passage 26 in plate 12 and its other end connected to a conventional pressure-operated diaphragm switch 28. The entire system, including bellows 10, tube 24 and the pressure bulb portion of switch 28, is completely filled with expansible fluid such as silicone oil. In use, the bellows 10 is immersed in the medium 23 being controlled, i.e. a beverage blend. As the temperature of medium 23 increases, bellows 10 and the fluid therein are heated so that the fluid expands up tube 24. When the temperature exceeds a certain value, the expanding fluid actuates switch 28. The switch, in turn, controls process equipment which restores the beverage to the correct temperature. When the temperature of the medium surrounding bellows 10 drops, the fluid in the system contracts down tube 24, thereby deactivating switch 28.

Figure 2:
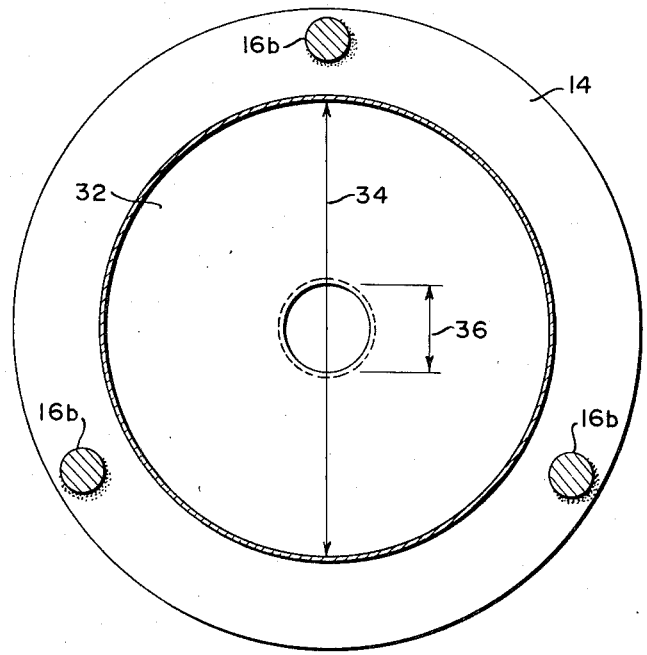
FIG. 2 is a view along line 2–2 of FIG. 1.

In accordance with this invention, bellows 10 is constructed so that its surface-to-volume ratio is a maximum. Preferably, it should exceed 70 to 1. That is, as best seen in FIG. 2, each bellows diaphragm 32 is a wide dished annulus having a very large outer diameter 34 in comparison with its inner diameter 36 (i.e. at least on the order of 2 to 1).

With this arrangement, most of the fluid contained in the bellows is distributed in relatively thin layers in the short, wide bellows convolutions. Thus, by far the larger portion of the fluid is at or very close to one of the thin bellows walls and, therefore, in close proximity to, and in intimate heat exchange contact with, the medium 23 outside of the sensor whose temperature is being controlled. This construction also means that total volume of fluid in the system is a minimum. Therefore, the average temperature of the fluid follows the temperature of the medium 23 very closely so that there is minimum lag between an excessive temperature condition of the medium and actuation of switch 28 which initiates correction of the excessive temperature condition.

The present sensor construction stands in sharp contrast to prior sensors employing finned tubes. In those, each heat exchange fin only contracts the tube containing the expansible fluid along an edge. Therefore, the fluid is not spread out in thin layers and there is essentially no surface-to-surface contact between the fluid and the fins. Merely making the fins larger does not materially improve the heat exchange characteristics of the prior sensors because a proportionately greater part of each fin is then farther away from the fluid in the tube to which the heat is being conducted.

Referring again to FIG. 1, the effective volume of bellows 10 can be adjusted by rotating rod sections 16a one way or the other to expand or contract the bellows. This feature provides a convenient way to calibrate the sensor to adjust its volume to accommodate different fluids that might be used in it or to set the system to respond to a particular temperature condition.

FIG. 3 shows another sensor embodiment with the pressure responsive device actually attached to the sensor. More particularly, the sensor 40 drives a linear actuator, i.e. a bellows 42 secured to the top of the sensor.

The sensor comprises a bellows 44, similar to bellows 10, closed off by end plates 46 and 48. Suitable holes 50 for mounting are provided in plate 46. A rigid rod 52 inside bellows 44 and connected between plates 46 and 48 prevents the bellows 44 from expanding or contracting.

Bellows 42 has end plates 54 and 56. Plate 54 is arranged to bear against the device to be actuated, i.e. a switch, and plate 56 is secured to the top of plate 46 coaxially with that plate.

A circular array of passages 58 are formed in plates 46 and 56 to provide fluid communication between bellows 44 and bellows 42.

In use, the system is filled with fluid and operates as described above in connection with the FIGS. 1 and 2 embodiment.

The foregoing shows then that my improved temperature sensor responds very quickly and accurately to changing temperature conditions. This is because the bellows portion of the sensor obtains maximum heat transfer between the medium being controlled and the expansible fluid inside the sensor. The improved heat transfer characteristics of the sensor derive, in turn, from thin, highly conductive bellows walls, the small overall volume defined by the bellows and the very large surface-to-volume ratio obtained by the bellows configuration disclosed herein.

It will thus be seen that the objects set forth above, among those made apparent from the preceding description, are efficiently attained. Also, certain changes may be made in the above construction without departing from the scope of the invention. Therefore, it is intended that all matter contained in the above description or shown in the accompanying drawings shall be interpreted as illustrative and not in a limiting sense.

It is also to be understood that the following claims are intended to cover all f the generic and specific features of the invention described herein.

I claim:

1. A temperature sensor comprising
   A. a thin-walled, thermally conductive bellows for immersion in a fluid medium whose temperature is to be sensed, said bellows having a plurality of convolutions defining a single fluidtight chamber,
   B. end plates closing off the ends of the bellows,
   C. means connected between the end plates for fixing the volume defined by the bellows, so that there is essentially no relative movement between the bellows convolutions, and
   D. a fluid passage communicating through one of the plates to the interior of the bellows said bellows having a maximum surface-to-volume ratio so that most of any fluid in the bellows is distributed in relatively thin layers adjacent the walls of the bellows whereby the temperature of a fluid inside the bellows closely follows that of the medium outside the bellows.

2. A temperature sensor as defined in claim 1 wherein the surface-to-volume ratio defined by the bellows exceeds 70 to 1.

3. A temperature sensor as defined in claim 1 and further including pressure responsive means connected to the opposite ends of the passage.

4. A temperature sensor as defined in claim 1 and further including means for adjusting the fixing means so as to vary the volume of the bellows for calibration purposes.

5. A temperature sensor for immersion in a fluid medium whose temperature is to be sensed comprising
   A. a thin-walled, thermally conductive bellows,
   B. end plates closing off the ends of the bellows,
   C. means connected between the end plates for preventing relative movement of the plates and thereby fixing the volume defined by the bellows,
   D. at least one small diameter passage extending through one of the plates into the interior of the bellows, and
   E. an expansible fluid filling the passage and bellows, said bellows having a maximum surface-to-volume ratio so that most of the fluid in the bellows is distributed in relatively thin layers adjacent walls of the bellows whereby the temperature of the fluid inside the bellows closely follows that of the medium outside the bellows.

6. A temperature sensor as defined in claim 5 wherein the bellows has a surface-to-volume ratio exceeding 70 to 1.

7. A temperature sensor as defined in claim 5 and further including a pressure operated device connected to the opposite end of the passage and responsive to expansions of the fluid in the sensor.

8. A temperature sensor as defined in claim 5 wherein the bellows is composed of a train of annular diaphragms, the ratio of whose outer and inner diameters exceeds 2 to 1.

9. A temperature sensor as defined in claim 5 and further including means for adjusting the spacing between said plates so as to adjust the volume of the bellows as a means for calibrating the sensor.

10. A temperature sensor as defined in claim 5 wherein the connected means comprises a rigid rod inside the bellows.